United States Patent Office 2,752,192
Patented June 26, 1956

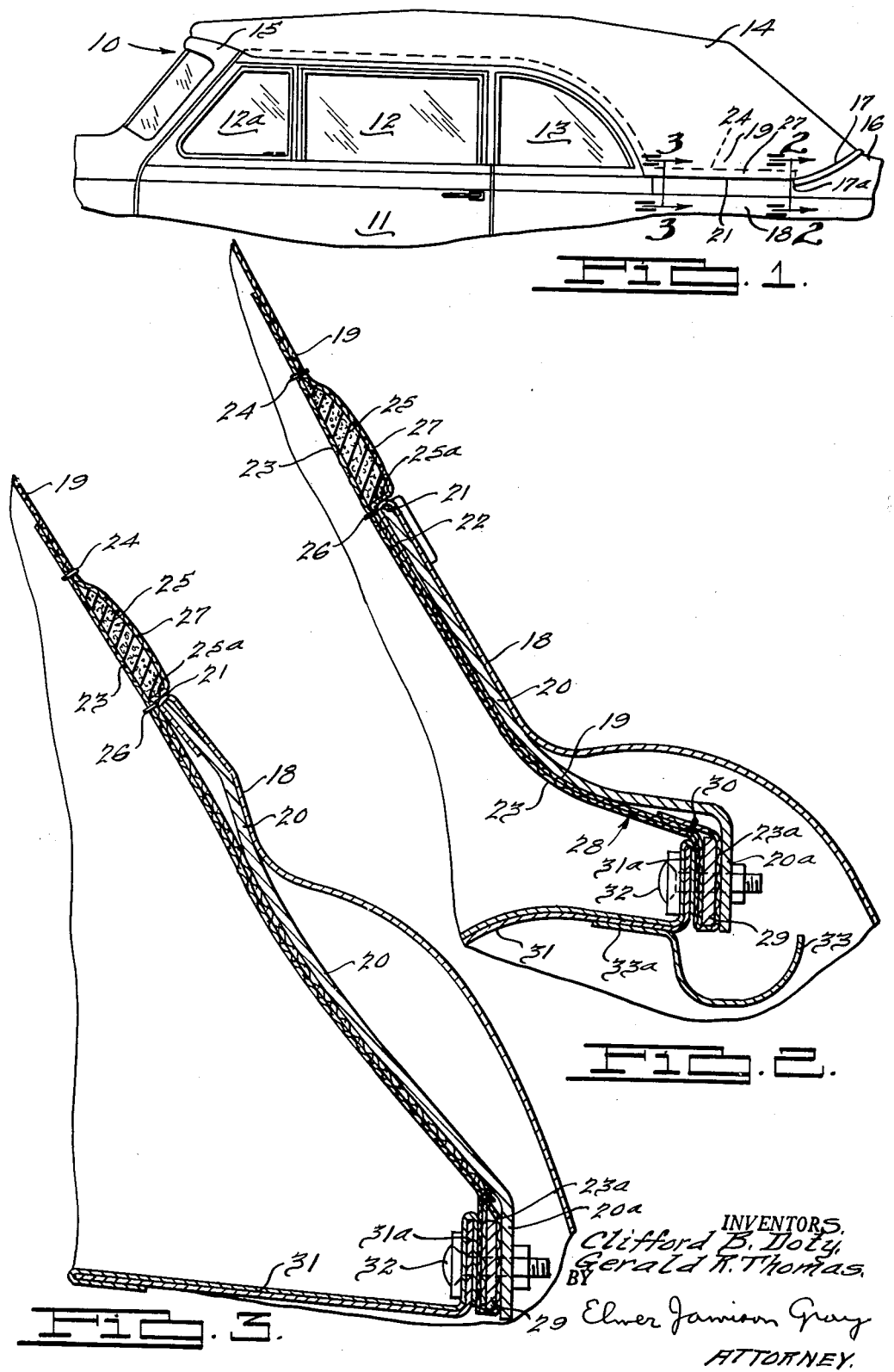

2,752,192

SEAL MEANS FOR A CONVERTIBLE VEHICLE TOP

Clifford B. Doty and Gerald R. Thomas, Detroit, Mich., assignors, by mesne assignments, to Chrysler Corporation, a corporation of Delaware Application August 8, 1952, Serial No. 303,298

2 Claims. (Cl. 296—107)

This invention relates to vehicle bodies and more particularly to automobile bodies of the so-called convertible type having foldable or collapsible tops.

An automobile body incorporating the present invention is constructed with a foldable top assembly, including a flexible or fabric top covering, capable of being unfolded or raised into open position so as to assume the desired position with respect to the sides of the body and windshield header thereof, and also capable of being folded or collapsed into the body as a compact unit. The top material is permanently attached along the rear edge thereof to the upper edge of the body. At each side of the body rearwardly of the rear side or rear quarter window the top covering material is provided with a downward extension or section which is disposed within the body. This section of the top material extends well down below the belt line or upper edge of the outer side or rear quarter panel of the body and is attached along its lower edge to an inner frame member of the body. The provision of this side section of the top material, disposed within the body and unattached thereto along the belt line in rear of the rear quarter window, facilitates opening and closing operations of the foldable top assembly and avoids the inconvenience and disadvantage of manually fastening the top material along the rear sides of the body after raising the top or unfastening the same before collapsing the top.

With a foldable top assembly constructed in accordance with the foregoing it is important that means be provided for preventing or reducing materially the ingress of water between the top material and the upper edge of the body at the locality where the top material extends downwardly within the body. In accordance with the present invention and as an object thereof this is accomplished in efficient manner by incorporating in the top material an improved weatherstrip which extends longitudinally along the belt line immediately above the upper edge of the body side or rear quarter panel. This weatherstrip is formed by a flexible insert member bounded exteriorly by a portion of the top material and interiorly by a backing strip of flexible or fabric material. The weatherstrip is formed as a protruding portion of the top material which overlies and preferably engages the upper terminal edge of the outer side panel of the body. When the top is fully raised or opened the top material, in accordance with usual practice, is drawn taught thereby placing the weatherstrip under longitudinal stress or tension, resulting in holding the same firmly or snugly in position against or along the upper edge of the body panel. By virtue of this improved weatherstrip construction the top material in effect protrudes outwardly above the upper edge of the body and, consequently, sheds water or, in other words, deflects the water outwardly so as to cause it to flow down the outside of the body. Since the weatherstrip section is under longitudinal tension and, therefore, taut, and preferably projects outwardly a desired distance beyond the upper edge of the body panel, it serves the purpose of preventing to a large degree the ingress of rain as well as serving as a water deflector.

Other objects of this invention will appear in the following description and appended claims, reference being had to the accompanying drawings forming a part of this specification wherein like reference characters designate corresponding parts in the several views.

Fig. 1 is a fragmentary side elevation illustrating a convertible automobile body having a foldable or collapsible top constructed in accordance with the present invention.

Fig. 2 is an enlarged fragmentary sectional elevation taken substantially through lines 2—2 of Fig. 1 looking in the direction of the arrows.

Fig. 3 is an enlarged sectional elevation taken substantially through lines 3—3 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, an automobile body of the convertible type constructed in accordance with one embodiment of the present invention. In Fig. 1 a convertible body of the two-door type is illustrated. However, it will be understood that the invention may be utilized with other types of convertible bodies, such as the four-door type. The body, generally illustrated at 10, is provided with a door 11 at each side, each door having incorporated therein the usual sliding window panel 12 and pivoted glass wing 12a. In rear of the door 11 the body is provided with a rear quarter window 13. Carried by the body 10 is a collapsible or foldable top 14 adapted to be folded into a compartment or space at the rear of the vehicle. When the foldable top 14 is raised or in fully open position, as shown in Fig. 1, it is releasably attached at its forward edge to the windshield header 15. The foldable top is also attached in any conventional manner along the rear edge thereof to the rear panel structure 16 of the body. The line of attachment of the top along the rear of the body may be finished by means of a suitable molding strip 17.

The molding 17, along which the rear edge of the foldable top is permanently attached to the body, extends along a curve and terminates at each side at a suitable point 17a adjacent and above the upper edge of the rear side or quarter panel 18 of the body. From the point 17a the fabric or flexible material of the top 14 has a side extension or section 19 which extends downwardly within the body as more clearly shown in Figs. 2 and 3. It will be understood that the fabric or flexible top 14 is attached to the folding top mechanism (not shown) which comprises folding side rails, linkage and bows. This folding top mechanism may be constructed, if desired, in accordance with application Serial No. 296,551, now Patent 2,710,223 dated June 7, 1955.

As illustrated in Figs. 2 and 3, the depending side or flap extensions 19 of the top material 14 extend downwardly within the body in the regions rearwardly of the rear quarter windows 13. The body at each side is provided with a belt bar or reinforcing frame member 20 which terminates along its upper edge at the belt line. The outer side or rear quarter panel 18 is folded over and around the upper longitudinal edge of the frame member 20, as illustrated at 21, and thence the metal of the panel 18 is folded down to provide an extension 22 along the inner face of the frame member 20. This extension 22 may be permanently secured to the frame member 20 as by spot welding.

The upper folded edge 21 of the rear side or quarter panel 18 lies at the belt line of the body, and since the section 19 of the top material extends downwardly within the body there is provided, in accordance with the present invention, weatherstrip means for reducing or minimizing the ingress of water into the body between the upper edge 21 of the side panel 18 and the extension 19 of the top material. A backing sheet or strip 23 of fabric or other flexible material is applied to the inner face of the top extension or section 19 and secured thereto, as by stitching, along a line 24 spaced above the edge 21 of the panel 18. Interposed between the backing material 23 and the extension 19 of the top material is a weatherstrip member or element 25 which may comprise a strip of sponge rubber. This strip 25 is confined within a pocket between the materials 19 and 23 which is formed by an outward protuberance of a portion of the material 19. There is thus provided a weatherstrip 27 which protrudes outwardly above and preferably beyond the edge 21 of the panel 18.

It will be noted in Figs. 2 and 3 that the bottom 25a of the weatherstrip member 25 is substantially flat and the outer fabric material is extended inwardly along the bottom portion 25a to meet the backing sheet 23 to which it is secured, as by stitching, along a line 26 which lies substantially at the level of the upper edge 21 of the rear quarter panel 18. The weatherstrip 27, constructed as above described, extends the full length of the edge 21 of the rear quarter panel in the region rearwardly of the rear quarter window 13. The bottom of the weatherstrip provides a substantially flat shoulder which overlies and preferably snugly engages the upper edge 21 of the side panel 18.

In the present embodiment the backing material 23 and extension 19 of the top material extend contiguously within the body downwardly along the inner face of the frame member or belt bar 20, as indicated at 28, and the lower end portions of these materials are attached to a tacking strip 29. The backing strip is folded around the tacking strip and back upon itself and securely stitched to the materials along a line 30. As illustrated in Figs. 2 and 3, an inner fabric covered trim panel 31 is mounted within the body. This panel terminates outwardly in an upright longitudinal flange 31a which engages the materials 19 and 23 along the inner side of the tacking strip 29, the latter being positioned against the inner face of a depending flange 20a of the frame member 20. The tacking strip 29 and the flange 31a of the trim panel are secured together and to the flange 20a of the frame member 20 in any suitable manner, such as by means of screws 32. Beneath the lower edge of the flange 20a there is provided a drain trough 33 which has a flange 33a underlying the trim panel 31 and secured thereto, as by spot welding. Any water which may seep into the interior of the body between the upper edge 21 of the panel 18 and the fabric material 19 will be caught by the drain trough 33 and thence flow out of the body at any suitable locality.

From the foregoing it will be seen that the present invention provides an improved weatherstrip means for preventing or reducing to a minimum the ingress of water into the body above the upper edge of the rear quarter panel 18. This weatherstrip means is incorporated in the foldable top and comprises a flexible weatherstrip member interposed between the backing sheet 23 and the side extension 19 of the top material which extends downwardly within the body. The weatherstrip member 25 is effective to cause a portion of the top material 19 to protrude outwardly and thus produce a weatherstrip 27 which overlies the upper edge of the panel 20 and thereby serves as a water deflector. When the foldable top is fully raised or in open position as shown in Fig. 1, the top material 14 is drawn taut by the operating mechanism, and this results in placing the weatherstrip 27 under longitudinal tension. As a consequence, the weatherstrip tends to remain firmly and snugly in position along the upper edge of the rear quarter panel 18, thereby resisting inward displacement thereof.

We claim:

1. In a convertible body having an outer side panel, a foldable top including flexible top material secured to the rear of the body and having a vertical side section extending downwardly within the body at the region of said panel, a backing sheet of flexible material disposed at the inner side of said top material and attached thereto along a line spaced above the upper edge of said panel, a weatherstrip member interposed between said backing sheet and a portion of the top material immediately below said line of attachment and effective with said portion to provide a weatherstrip protruding outwardly beyond the outer plane of said panel to deflect water therefrom and being also seated firmly on said upper edge to comprise a weather seal thereat.

2. In a convertible body having an outer side panel, a foldable top including flexible top material secured to the rear of the body and having a vertical side section extending downwardly within the body at the region of said panel, a backing sheet of flexible material disposed at the inner side of said top material, a weatherstrip member interposed between said backing sheet and top material and confined within a pocket formed by an outwardly protruding portion of said top material, and means for attaching said backing sheet and top material along spaced lines immediately above and below said weatherstrip member, the bottom of said protruding portion being seated firmly on the upper edge of said panel to comprise a weather seal thereat and extending laterally beyond said edge to deflect water therefrom.

References Cited in the file of this patent

UNITED STATES PATENTS

| | | |
|---|---|---|
| 1,809,505 | Campbell | June 9, 1931 |
| 1,990,848 | Velo | Feb. 12, 1935 |
| 2,448,054 | Seckel | Aug. 31, 1948 |
| 2,549,153 | Ackermans | Apr. 17, 1951 |
| 2,569,724 | Mackie et al. | Oct. 2, 1951 |
| 2,649,330 | Schamel et al. | Aug. 18, 1953 |